(12) United States Patent
Winkel et al.

(10) Patent No.: US 10,083,033 B2
(45) Date of Patent: Sep. 25, 2018

(54) APPARATUS AND METHOD FOR EFFICIENT REGISTER ALLOCATION AND RECLAMATION

(71) Applicant: INTEL CORPORATION, Santa Clara, CA (US)

(72) Inventors: Sebastian Winkel, Los Altos, CA (US); Girish Venkatasubramanian, Sunnyvale, CA (US); Tyler N. Sondag, Newark, CA (US); Rolf Kassa, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 14/643,855

(22) Filed: Mar. 10, 2015

(65) Prior Publication Data

US 2016/0266901 A1    Sep. 15, 2016

(51) Int. Cl.
*G06F 9/30* (2018.01)

(52) U.S. Cl.
CPC ........ *G06F 9/3012* (2013.01); *G06F 9/30145* (2013.01)

(58) Field of Classification Search
CPC .............................. G06F 9/3012; G06F 9/384
See application file for complete search history.

(56) References Cited

U.S. PATENT DOCUMENTS

| | | | | |
|---|---|---|---|---|
| 2003/0154419 A1* | 8/2003 | Zang | .......................... | G06F 8/52 714/2 |
| 2009/0217020 A1* | 8/2009 | Yourst | ..................... | G06F 9/383 712/245 |
| 2011/0161616 A1* | 6/2011 | Tarjan | ..................... | G06F 9/384 711/170 |
| 2013/0024675 A1* | 1/2013 | Lovett | ..................... | G06F 9/322 712/233 |
| 2013/0275720 A1* | 10/2013 | Keller | ................. | G06F 9/30032 712/205 |
| 2014/0095838 A1* | 4/2014 | Kadgi | ..................... | G06F 9/384 712/220 |

\* cited by examiner

*Primary Examiner* — Aimee Li
*Assistant Examiner* — William V Nguyen
(74) *Attorney, Agent, or Firm* — Nicholson De Vos Webster & Elliott LLP

(57) ABSTRACT

A method and apparatus are described for efficient register reclamation. For example, one embodiment of an apparatus comprises: single usage detection and tagging logic to examine a sequence of instructions to detect logical registers used by the sequence of instructions that have a single use and to tag an instruction as a single usage instruction if the instruction is a consumer of a logical register that has a single use; an allocator to allocate processor resources to execute the sequence of instructions, the processor resources including physical registers mapped to logical registers to execute the sequence of instructions; and register reclamation logic to free up a logical to physical mapping of a single use register in response to detecting the tag provided by the instruction tagging logic.

21 Claims, 21 Drawing Sheets

APPARATUS AND METHOD FOR EFFICIENT REGISTER ALLOCATION AND RECLAMATION

BACKGROUND

Field of the Invention

This invention relates generally to the field of computer processors and software. More particularly, the invention relates to an apparatus and method for efficient register reclamation.

Description of the Related Art

Because the latency of accessing a register for reading/writing is usually less than one cycle, the register in a way is the fastest unit of the memory hierarchy. Typically, the "logical" registers, i.e., the registers exposed by the semantics of the instruction set architecture (ISA), are used by the compiler as sources/destinations for operands as well as for holding temporaries. However, prior to execution of this code on the hardware, the logical registers (LRegs) are mapped to a set of physical registers (PRegs) by a process called Register Allocation (RA). Once the lifetime of the logical register is completed, i.e., there are no more consumers of the value held in the logical register prior to another value being stored in it, the logical-to-physical register mapping is torn down and the physical register is made available for allocation to another logical register. This process is called Register Reclamation (RR). Register mapping is typically held in a hardware table called the Register Allocation Table (RAT). The un-availability of free physical registers (i.e., physical registers not currently mapped to a logical register) causes all instruction allocation to stall until such a time that a free physical register is available, thereby reducing the performance.

One technique of ensuring higher availability of physical registers is to increase the size of the physical register file (PRF), i.e., the number of PRegs. However, as the size of the PRF increases accesses to the PRF take longer. Thus, the size can only be increased to a point where access time still remains fast (i.e., a single cycle).

An orthogonal technique is to improve the usage of the available physical registers. Specifically, having better register reclamation policies will result in better usage of the existing physical registers and in improved performance. Thus Register Reclamation is a significant determinant of performance in modern computer architectures.

One option for improving Register Reclamation is to build more intelligence into the register allocation and reclamation hardware, i.e., a hardware-only solution. Typically, in hardware-only solutions, register reclamation occurs when the logical register (LReg), which is mapped to a physical register (PReg), gets re-defined, i.e., a new Store (Write) occurs to the logical register. However, this store could execute many instructions after the last use of the value in the logical register. Thus the physical register PReg is unused between the last Load (Read) from LReg and the next Store (Write) to LReg. This sub-optimal usage of registers becomes worse when considered in the context of speculative execution as the Store (Write) which is used by the Register Allocation and Reclamation hardware to free up a PReg from the LReg to which it was mapped has to be non-speculative. Thus, efficacy of such hardware-only solutions is limited.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
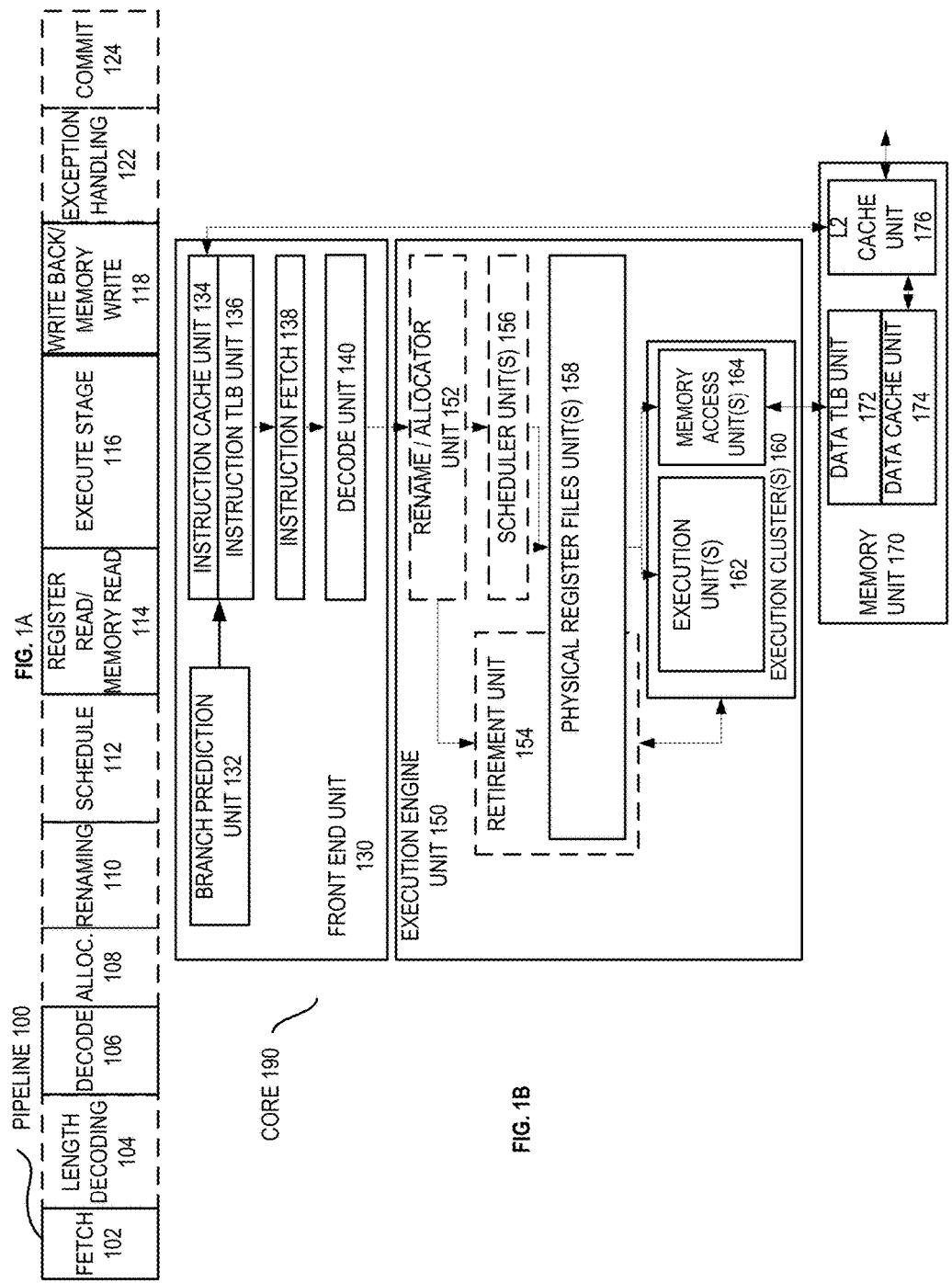
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
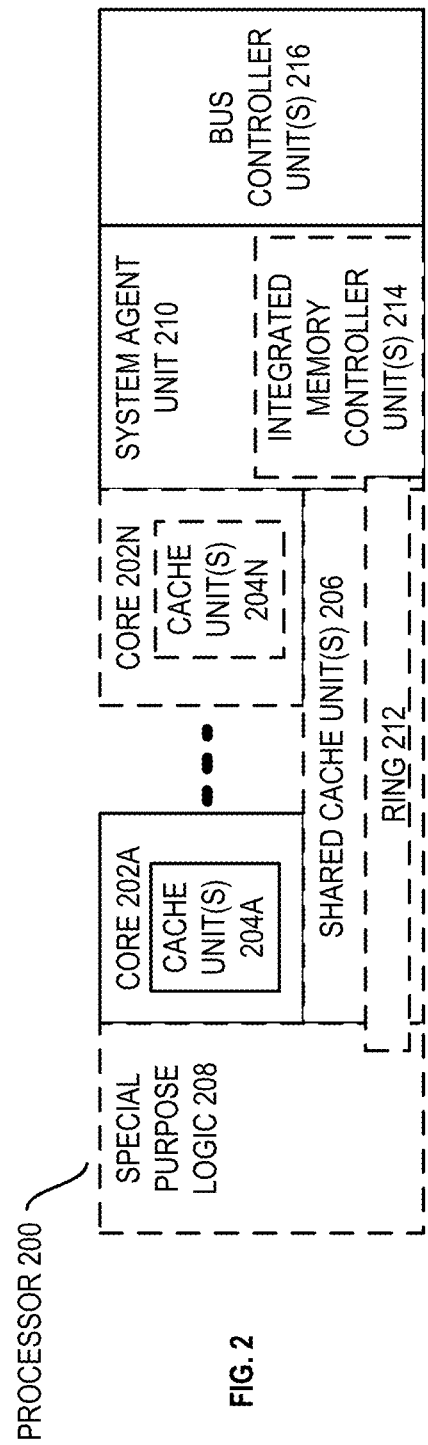
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
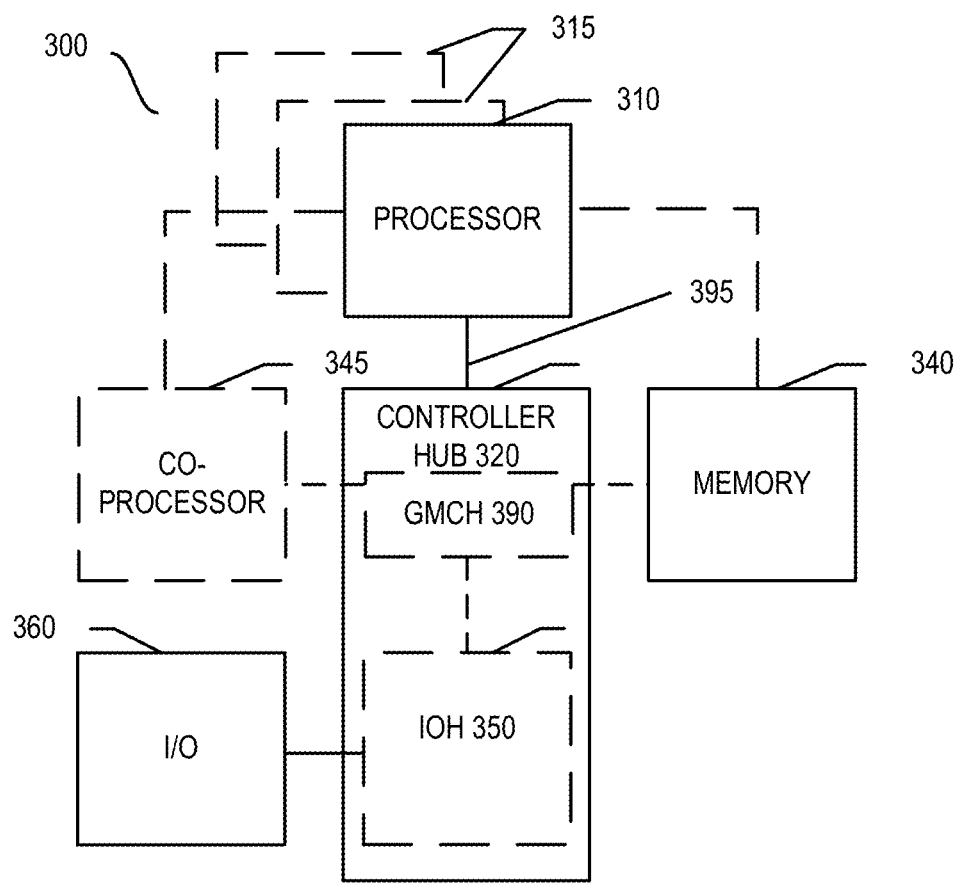
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
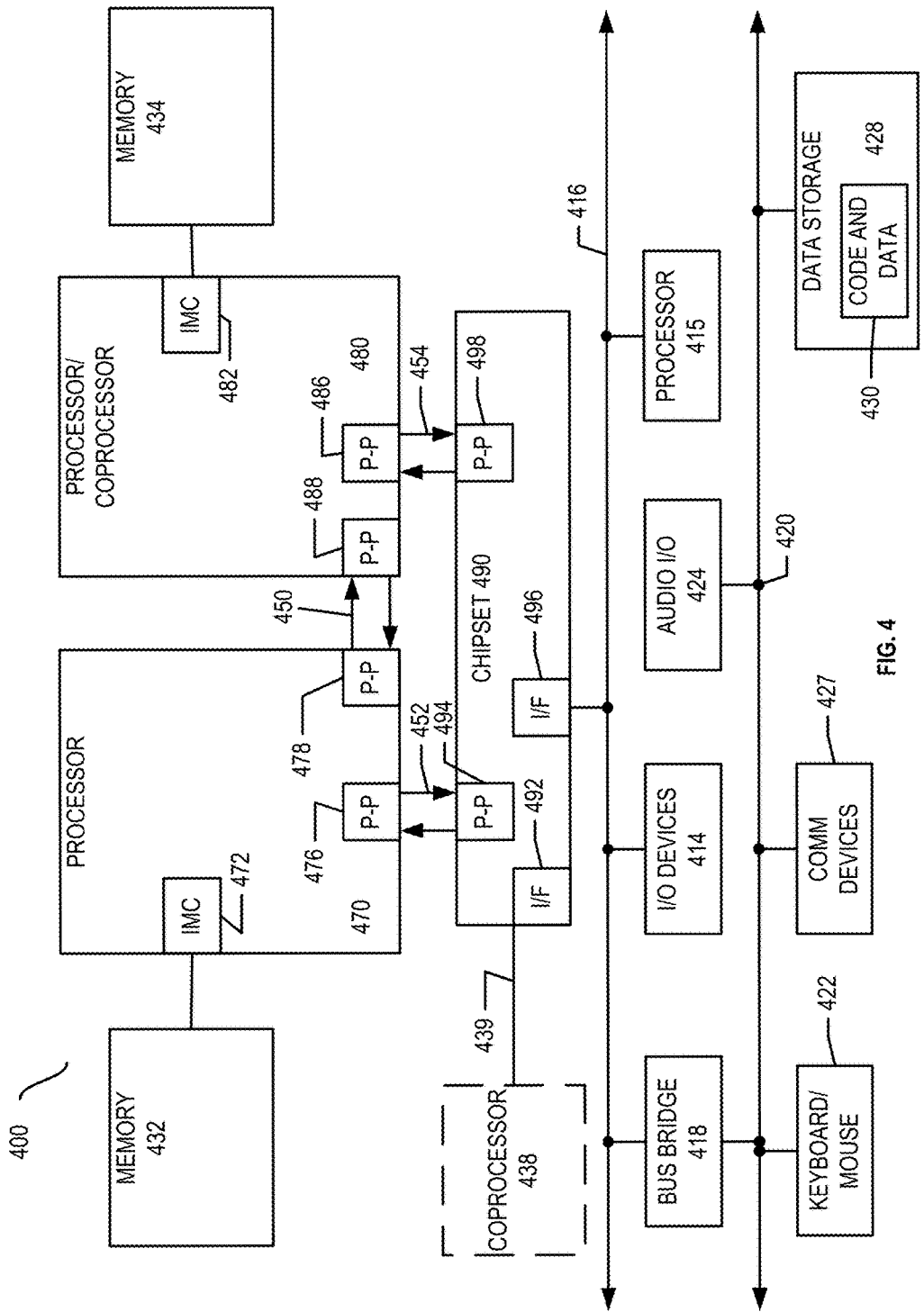
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
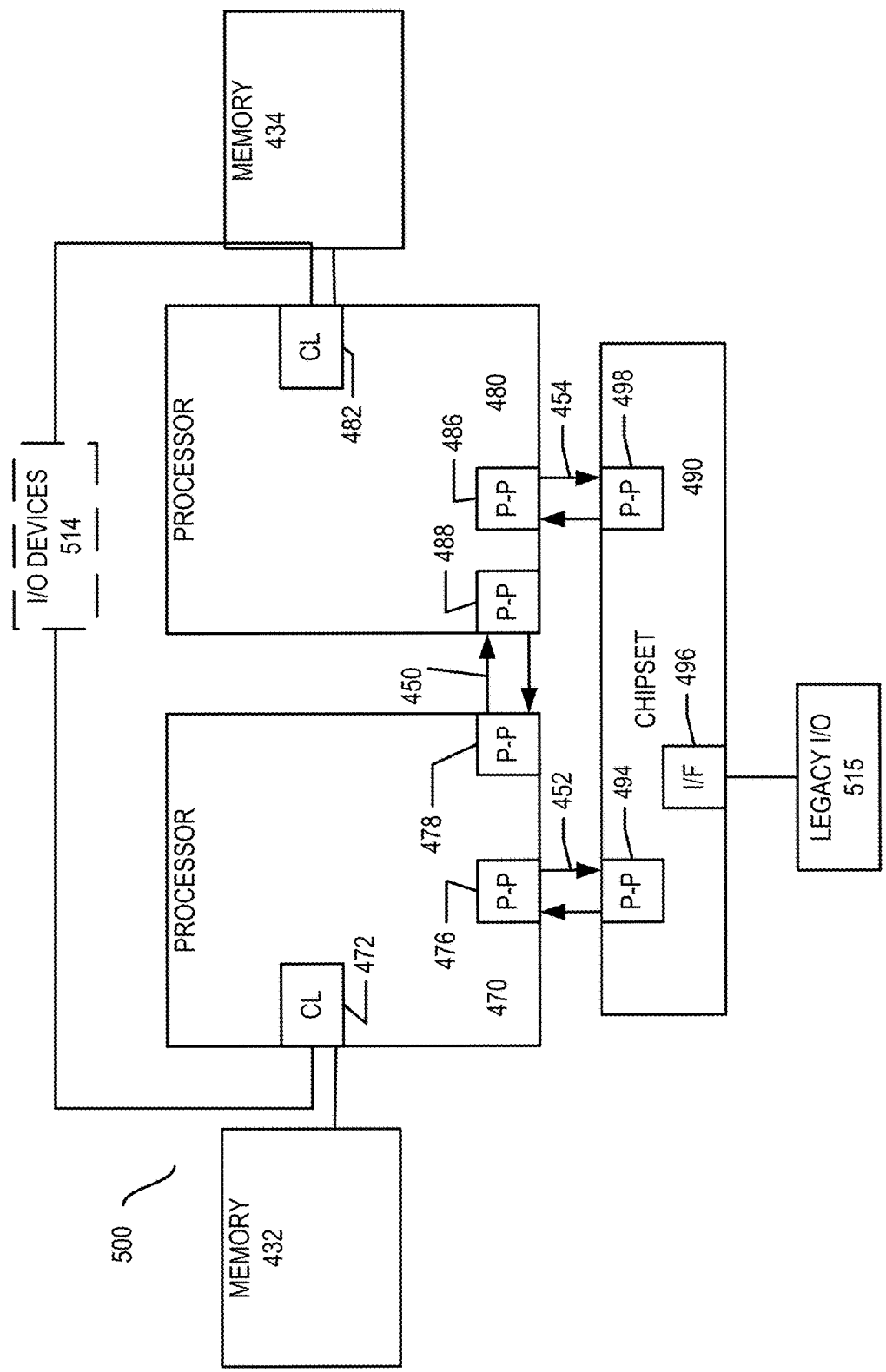
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
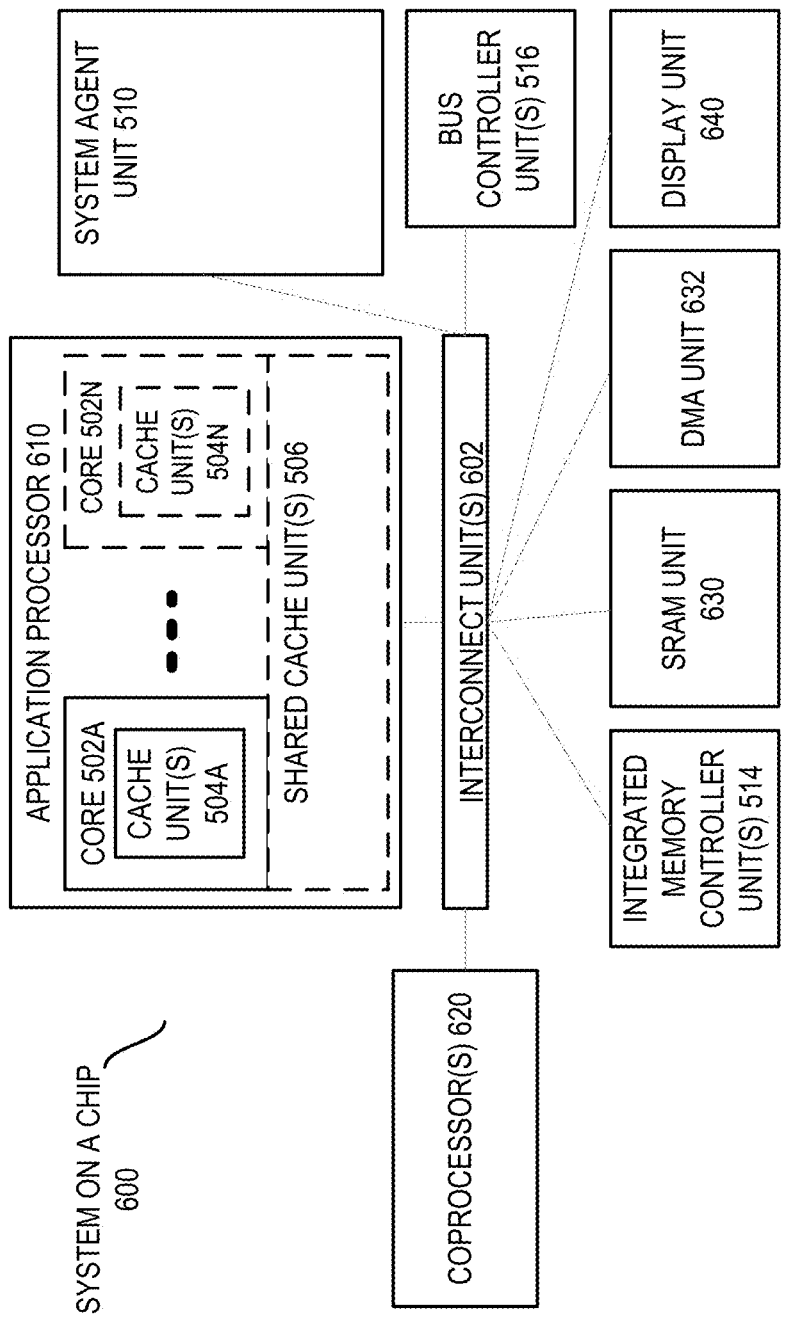
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
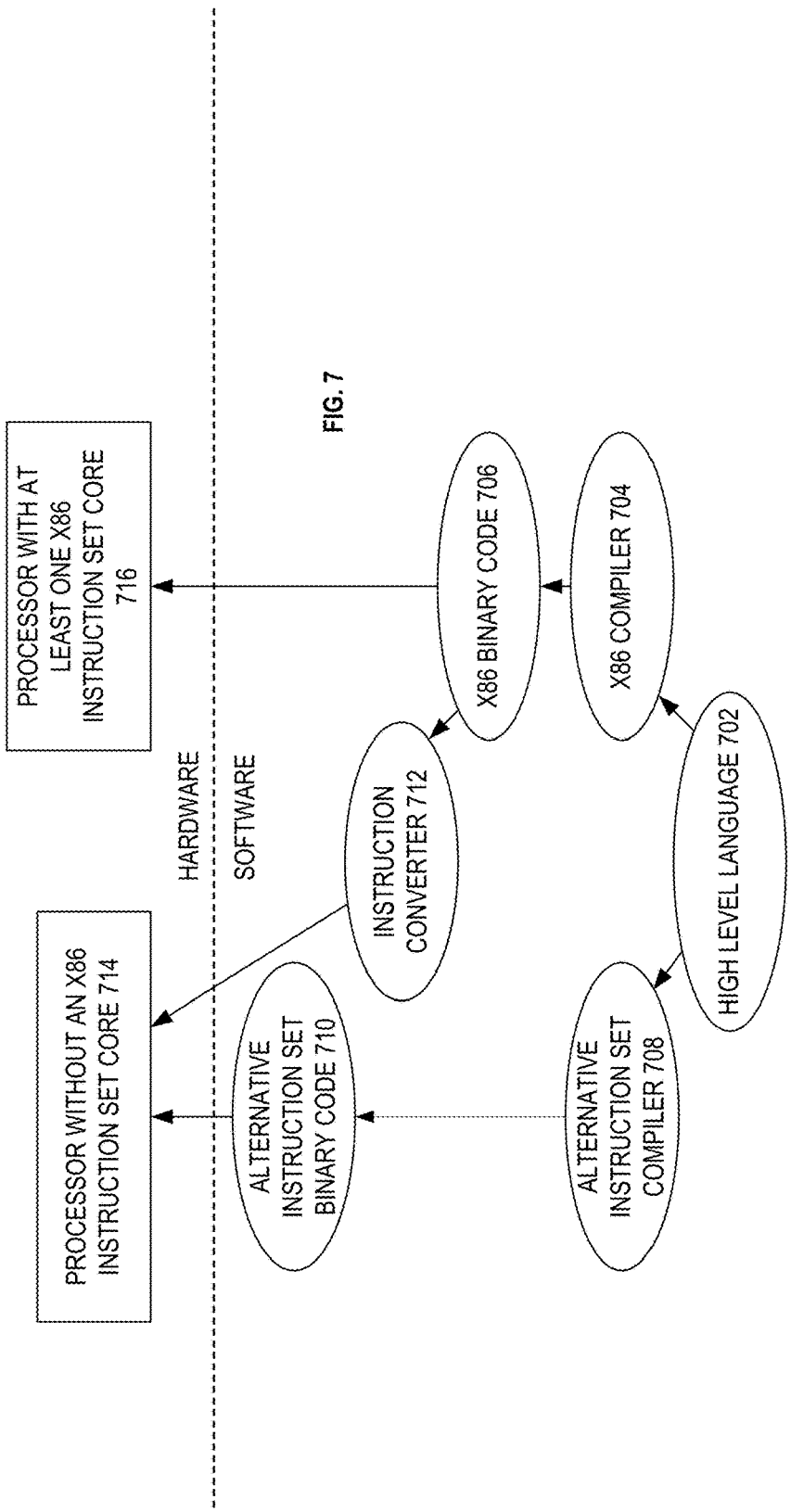
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Efficient Register Reclamation

The embodiments of the invention include a novel hardware-software co-designed register reclamation technique for Dynamic Binary Translation-based processors with a commit/rollback-based atomic execution model. One embodiment uses the Dynamic Binary Translation software to mark the cases where the LReg has no more than a single user/consumer in the static code. Such a marking is termed as a Single Usage (SU) marking. The register Reclamation hardware, on encountering a SU marking can tear down the LReg↔PReg mapping and reclaim the PReg without waiting for the next Store to the LReg. Such a co-designed scheme effectively improves the utilization of physical registers and reduces the pressure on the physical register file (PRF).

This, in turn, can be leveraged for designing the architecture with a smaller PRF to obtain the same performance as a machine with a conventional reclamation technique and a larger PRF. On the other hand, this technique may also be used to improve performance at a given PRF size by improving register utilization.

Figure 8:
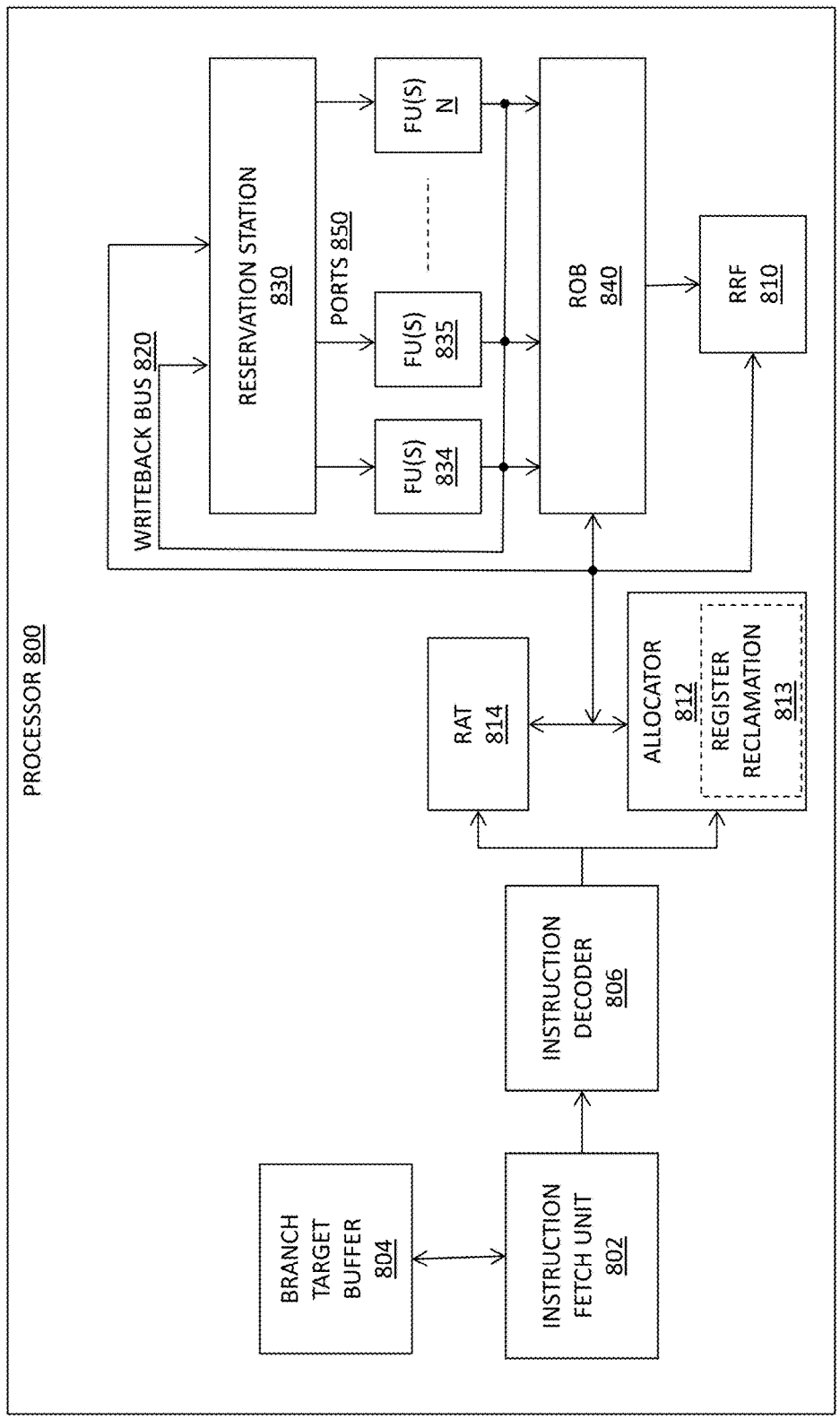
FIG. 8 illustrates a processor architecture employed in one embodiment of the invention.

FIG. 8 illustrates a processor architecture 800 showing architectural components which are particularly relevant to the embodiments of the invention described herein. In particular, FIG. 8 illustrates a speculative out-of-order microprocessor which may incorporate the embodiments of the invention. The processor comprises an instruction fetch unit (IFU) 802 coupled to a branch target buffer (BTB) 804 and an instruction decoder (ID) 806. Based upon the instruction pointer (IP) provided by the branch target buffer (BTB) 804 to the instruction fetch unit (IFU) 802, the instruction fetch unit (IFU) 802 fetches a macro instruction found at the address in memory (not shown) that is indicated by the IP. The instruction is decoded into one or more micro-operations (uops) by the instruction decoder 806. The instruction decoder 806 transfers the stream of uops to a register alias table (RAT) 814 and an allocator unit 812.

The allocator unit 812 assigns each incoming uop to a location in the reorder buffer (ROB) 840 and/or a physical register in a real register file (RRF) 810, thereby mapping the logical destination address of the uop to a corresponding physical destination address in the ROB 840 and/or physical register in the RRF 810. The register alias table (RAT) 814 (sometimes referred to as a "register allocation table") maintains this mapping.

The contents of a ROB 840 are retired to locations in the real register file (RRF) 810. The RAT 814 thus also stores a real register file valid bit that indicates whether the value indicated by the logical address is to be found at the physical address in the recorder buffer (ROB) or in the RRF after retirement. If found in the RRF, the value is considered to be part of the current processor architectural state. Based upon this mapping, the register alias table (RAT) 814 also associates every logical source address to a corresponding location in the ROB 840 and/or the RRF 810 (the source operand of one instruction generally must have been the destination of a previous instruction).

Each incoming uop is also assigned and written into an entry in the reservation station (RS) 830 by the allocator 812. The reservation station 830 assembles the uops awaiting execution by an appropriate functional unit 834, 835, N, which may include, for example, integer execution units, floating point execution units, memory execution units, address generation units, etc. Results of the execution by the functional units 834, 835, N may be written back to the RS 830 over a writeback bus 820.

In one embodiment, the allocator 812 includes register reclamation logic 813 for reclaiming physical registers where the associated logical register has not more than a single user/consumer in the static code (i.e., a Single Usage (SU) marking). The register reclamation logic, on encountering a SU marking may tear down the LReg↔PReg mapping and reclaim the PReg without waiting for the next Store to the LReg.

Figure 9:
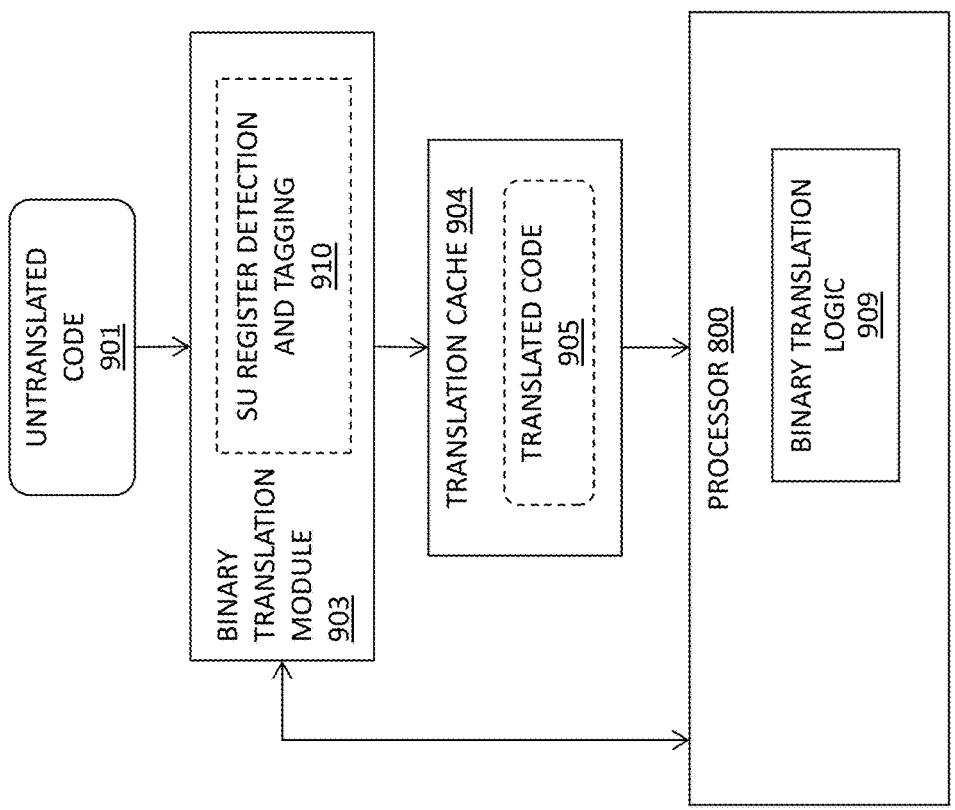
FIG. 9 illustrates a binary translation architecture employed in one embodiment of the invention.

FIG. 9 is a block diagram of an exemplary binary translation system 800 on which embodiments of the invention may be implemented. A binary translation module 903 translates untranslated program code 901, which is not designed for native execution on the processor 800, into translated code 905 which the processor is capable of executing. By way of example, if the processor is an x86 processor, then the translated code 905 may comprise x86 code. Alternatively, if the processor is designed with a non-x86 instruction set architecture but the untranslated code 901 comprises x86 code, then the binary translation module 903 translates the untranslated x86 code into a non-x86 translated code 904 which the processor 800 is capable of natively executing.

Once generated by the binary translation module 903, the translated code 905 may be stored within a translation cache 904 (e.g., in a high performance memory and/or a designated region of system memory). In one embodiment, the binary translation system also includes hardware components integrated within the processor 800, illustrated in FIG. 9 as binary translation logic 909, to support execution of binary translation functions (e.g., microarchitectural support to execute instructions designed specifically for binary translation operations).

One embodiment of the invention includes a co-designed Dynamic Binary Translation-based approach to detecting and marking static code where a Logical Register (LReg) has only one consumer (referred to as "Single Usage" or "SU") and utilizing this knowledge in a hardware register reclamation unit 813 to free up the Physical Register (PReg) allocated to this LReg as soon as this marking is encountered. In particular, as illustrated in FIG. 9, one embodiment of the binary translation module 903 includes single-use register detection and tagging logic 910 to detect scenarios where registers have a single usage and then marking instructions in the translated code 905 accordingly.

Figure 10:
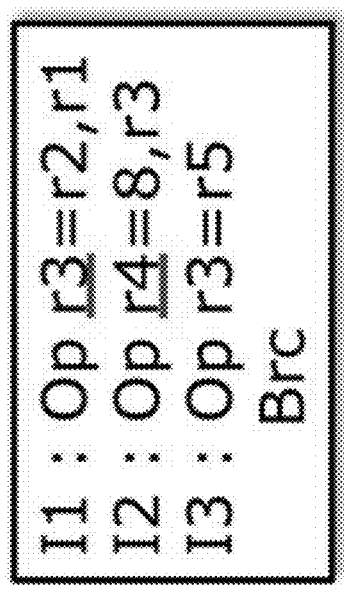
FIG. 10 illustrates a sequence of instructions in which a single usage scenario is detected by an embodiment of the invention.

In one embodiment, the formal definition for a Single Usage (SU) scenario is shown in FIG. 10. Specifically:

(a) A logical Register (LReg) is defined, i.e., is the destination of an instruction (I1) which produces a value in this register;

(b) The logical register is re-defined by an instruction (I3);

(c) Between the definition and re-definition of the LReg, there exists one and only one instruction (I2) which consumes the LReg, i.e., the LReg is a source of one and only one instruction before it gets redefined by I3.

In one embodiment, upon detection of a span of code that should be translated, the binary translation module 903 creates the translation and then the SU register detection and tagging logic 910 examines the generated static code to detect scenarios where registers have a Single Usage. Specifically, in one embodiment, the SU register detection and tagging logic 910 analyzes the code and detects the cases where the following conditions are met:

(a) a logical register is defined by being the destination of an instruction;

(b) the use of the logical register occurs only once; and (c) redefinition of the logical register occurs without any control flow dependence between the redefinition and the one use of the logical register.

The analysis performed by the SU register detection and tagging logic may be implemented as a separate pass or may be combined with any existing static register allocation passes in the binary translation module 903. The producer and the consumer instructions of the Single Usage scenario are marked as such (e.g., I1, I2 in the illustrated example).

If the consumer of the logical register (LReg) is not in the same basic block as the LReg definition, the SU register detecting and tagging logic 910 has to guarantee that there are no paths leading from the definition instruction which uses this LReg. Specifically, in one embodiment any conditional use of the LReg can be marked as single use as long as:

(a) not more than one usage of the LReg occurs on that path; and (b) the re-definition of LReg happens unconditionally (or on all conditional paths) after the first usage without any intervening usages (typically implying no conditional control flow between the first/only usage and the redefinition).

One embodiment of the invention is implemented within a processor 800 with a commit/rollback-based atomic execution model. Any mis-speculation in such a processor will result in the execution rolling back to the most recent commit point and restarting execution from that point onwards. In one embodiment, the single use detection techniques are cognizant of this fact and ensure that the single use producer and consumer are in the same atomic region. This ensures that any re-execution of the consumer will be preceded by a re-execution of the producer which will set up the LReg-↔PReg mapping again.

In one embodiment, the process for implementing the detection single use cases is as follows:

(a) Find a definition of a logical register (LReg).

(b) Check if there is a path from the definition of the LReg to the translation exit (all registers are assumed live-out) without a re-definition of LReg. If some such path is detected, then the check is considered to have failed as the definition of LReg cannot be guaranteed to have only one consumer.

(c) If the above check passes, identify all paths from the definition to the re-definition of LReg in the set P.

(d) For all paths in set P, (i) check if there is a consumer of LReg on this path; (ii) check if there are any possible paths from this consumer to the re-definition of LReg where there is yet another consumer of LReg; and (iii) if both these conditions are met, then declare that consumer as singe use (SU).

On the hardware end, the register allocation unit 812 is modified with the register reclamation logic 813 to free up the logical to physical mapping after completion (i.e. successful execution) of the single use instruction, without having to wait for the next definition of the logical register.

One refinement of the scheme described herein is in the context of a processor which offers in-order execution guarantees, as in the case of a true in-order processor or in the case of a micro-threaded processor where typically the execution of the instructions in a thread is in-order. In such cases, the hardware register allocator 812 may consider allocating from a special bank which gets de-allocated the first time the logical to physical mapping is referenced. Dependence need not be tracked for registers allocated from this bank as long as the consumer was executed non-speculatively.

Figure 11A:
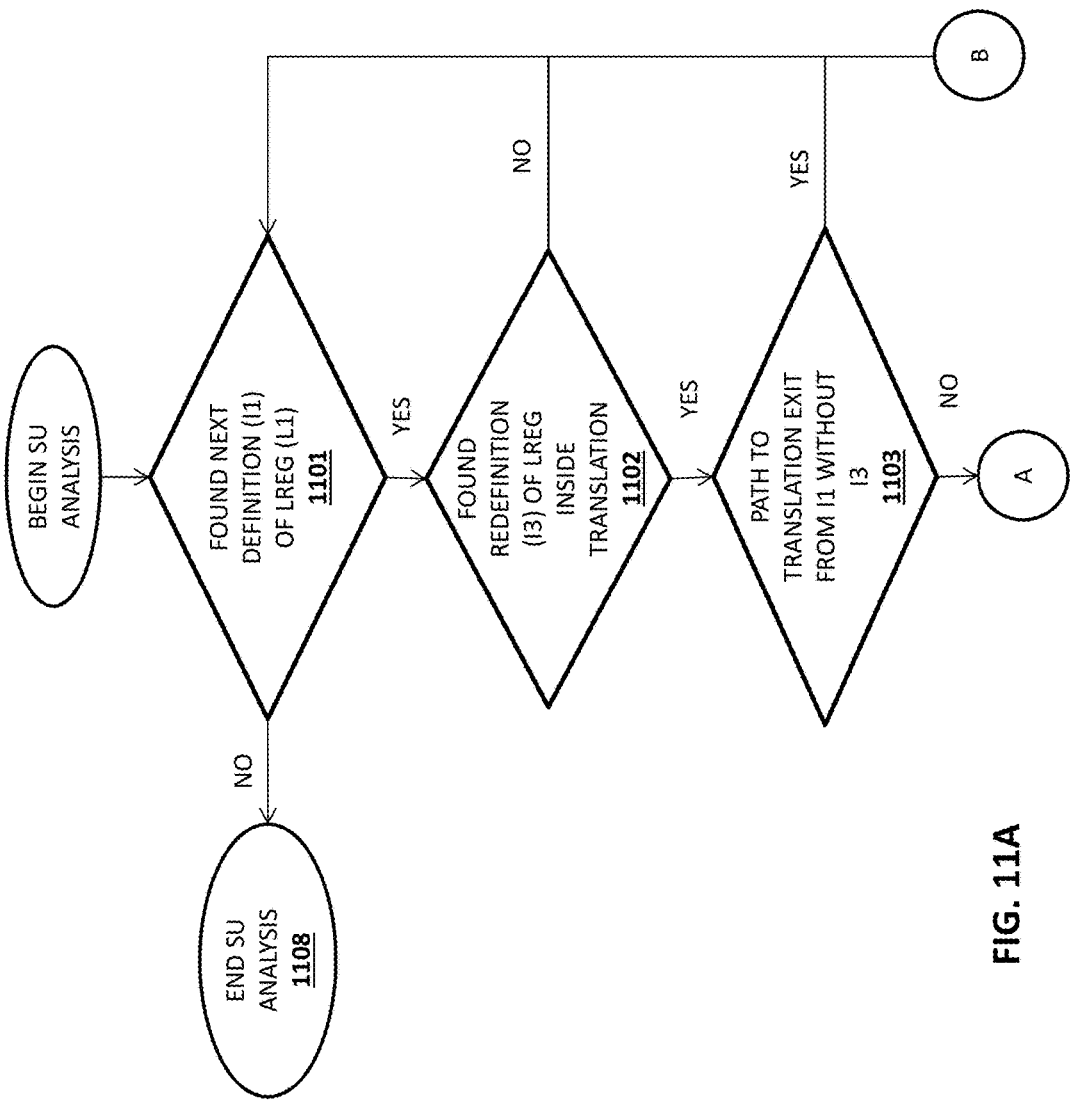
FIGS. 11A-B illustrates one embodiment of a process implemented by the single usage register detection and tagging logic.
Figure 11B:
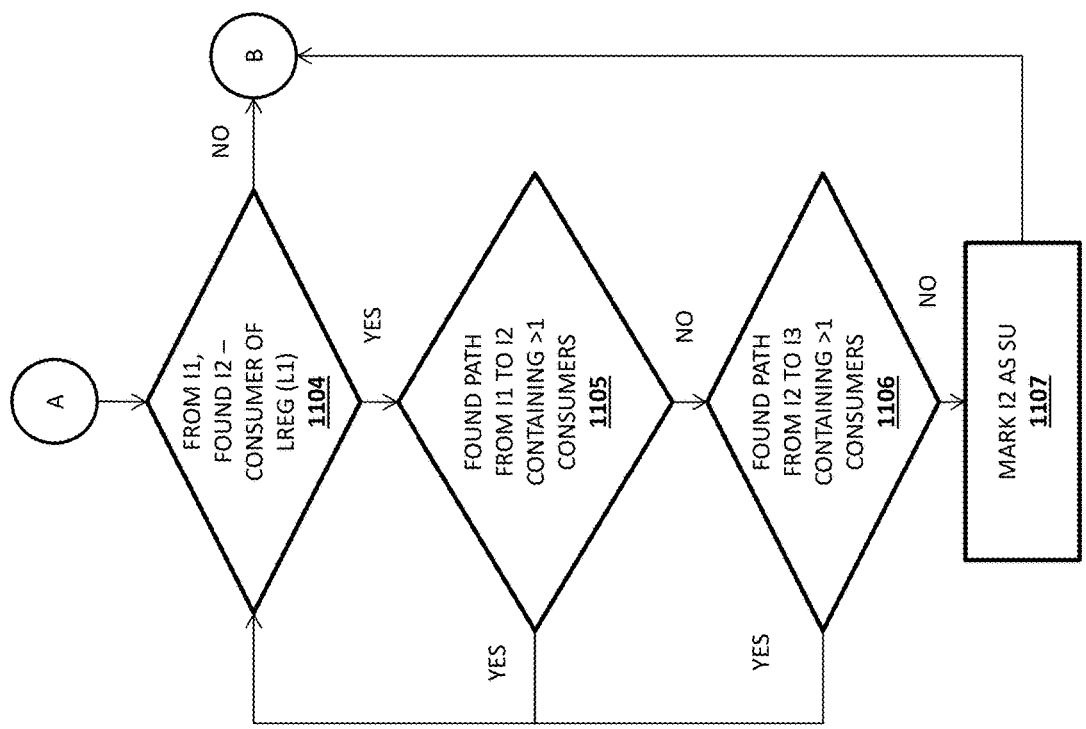
Figure 12:
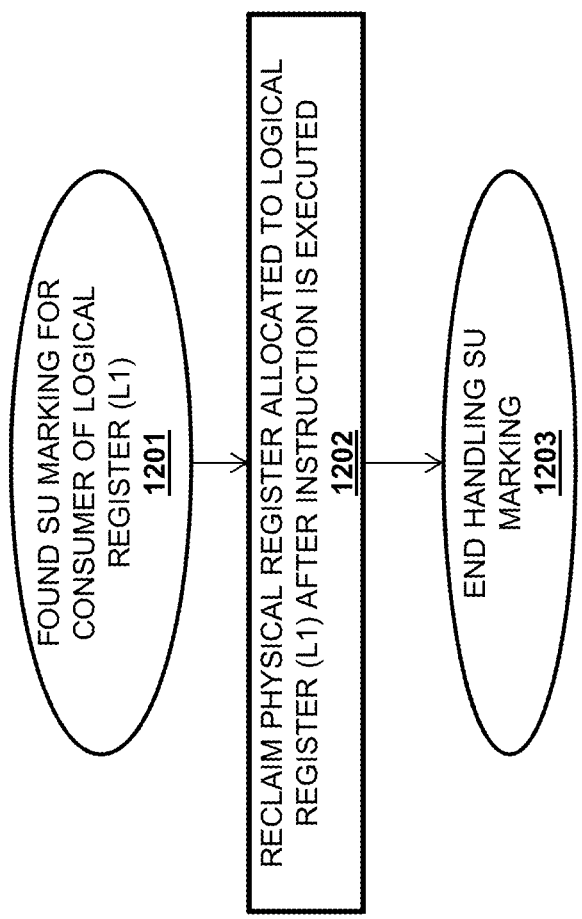
FIG. 12 illustrates one embodiment of a process implemented by the register reclamation logic.

One embodiment of a process implemented by the SU register detection and tagging logic 910 is illustrated in FIG. 11 and one embodiment of a process implemented by the register reclamation logic 813 is illustrated in FIG. 12.

Turning first to FIG. 11, after the next definition (I1) of a logical register (L1) is found, determined at 1101, a redefinition (I3) of the logical register may be found inside the translation at 1102. If not, the process returns to 1101. If so, then at 1103, it may be determined that no path to a translation exit exists from I1 without I3. In this case, at 1104, from I1, a determination is made as to whether a consumer of logical register L1 exists (i.e., instruction I2). If not, the process returns to 1101. If so, then at 1105, a determination is made as to whether a path from I1 to I2 contains more than one consumer. If so, the process returns to 1104. If not, then at 1106, a determination is made as to whether the path from I2 to I3 contains more than 1 consumer. If so, then the process returns to 1104. If not, then at 1107, instruction I2 is marked as single use (SU).

The embodiments of the invention may be implemented for N-use registers and instructions where N=2, 3, 4, etc. For example, the same techniques described herein may be applied to cases where a limited number of uses greater than a single use may be implemented. In such a case, the Dynamic Binary Translation software may mark the cases where the LReg has no more than N uses where N is set to an integer value. The register Reclamation hardware, on encountering an "N use" marking can tear down the LReg↔PReg mapping and reclaim the PReg without waiting for the next Store to the LReg.

FIG. 12 illustrates one embodiment of a process implemented by the register reclamation logic 813. At 1201, a single use (SU) marking is detected for a consumer of a logical register (L1). At 1202, the physical register allocated to the logical register (L1) is reclaimed (e.g., by register reclamation logic 813). At 1203, the processing in accordance with the SU marking is terminated.

One refinement of the scheme outlined in this disclosure is in the context of a processor which offers in-order execution guarantees, as in the case of a true in-order processor or in the case of micro-threaded processor where typically the execution of the instructions in a thread is in-order. In such cases, the hardware register allocator can consider allocating from special bank which gets de-allocated the first time the logical to physical mapping is referenced. Dependence need not be tracked for registers allocated from this bank as long as the consumer was executed non-speculatively.

One embodiment of the invention was simulated in the context of a VLIW full-system Dynamic Binary Translation (DBT)-based processor using a full-system functional and performance simulator. The DBT layer was augmented with the techniques described herein to detect and mark Single Usage scenarios using a hint bit (SU bit). This bit was then used by the modeled register reclamation microarchitecture to free up the Lreg↔Preg mapping on execution of the instruction which uses the Lreg and has the SU bit set. It should be noted that the SU detection algorithm is cognizant of this fact and ensures that the SU producer and consumer are in the same atomic region, ensuring that any re-execution of the consumer will be preceded by a re-execution of the producer which will set up the LReg-↔PReg mapping again. This experimental set up was used to simulate SPEC2K and SPEC2K6 benchmarks.

Figure 13:
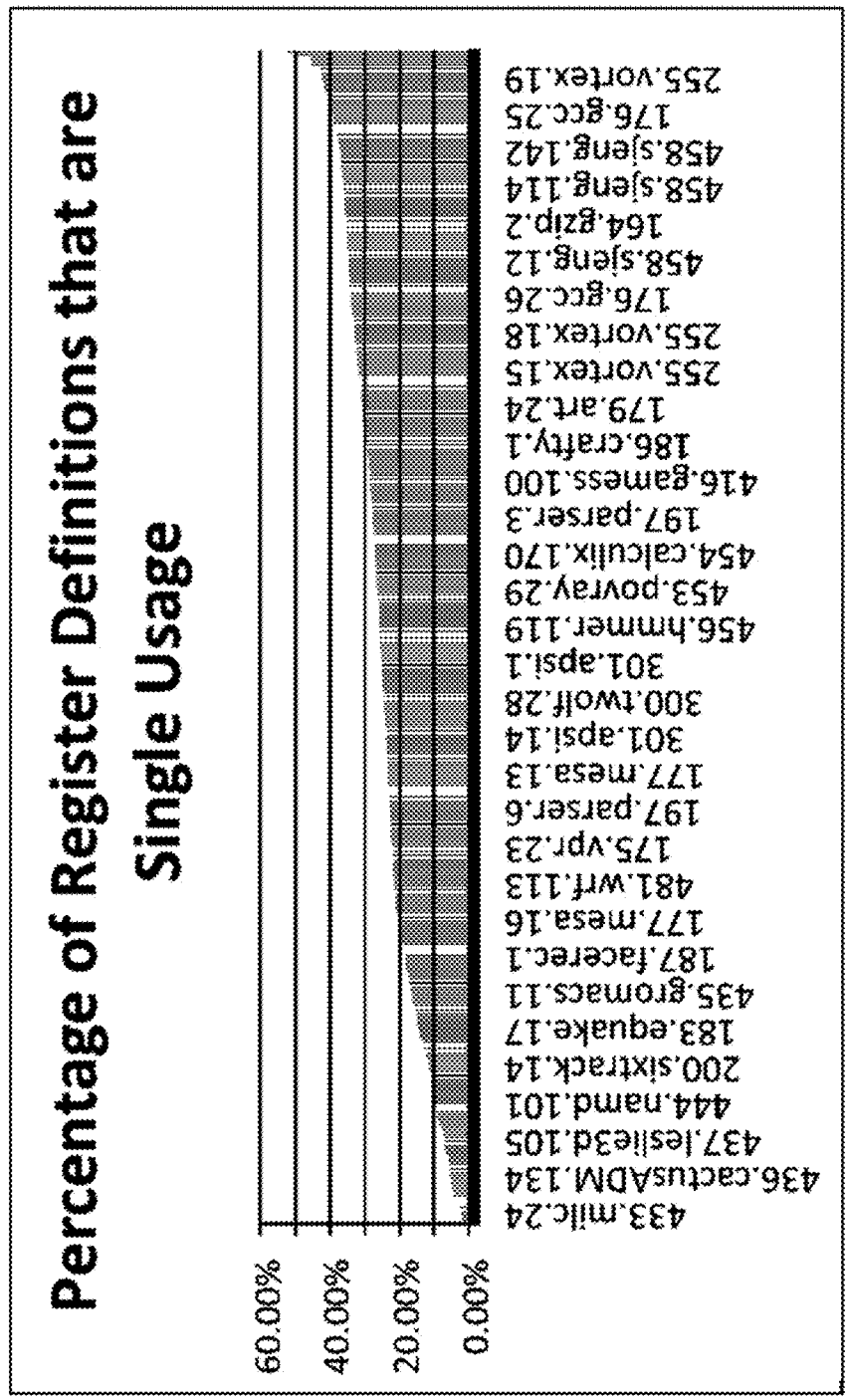
FIG. 13 illustrates a percentage of exemplary register definitions which are single usage.

FIG. 13 illustrates the number of register definitions (which are operations that establish an Lreg→Preg mapping) that are single usage (SU) and have no more than one consumer. It can be seen that, on an average, 26.8% of the register definitions are identified as SU cases in the binary translator.

Figure 14:
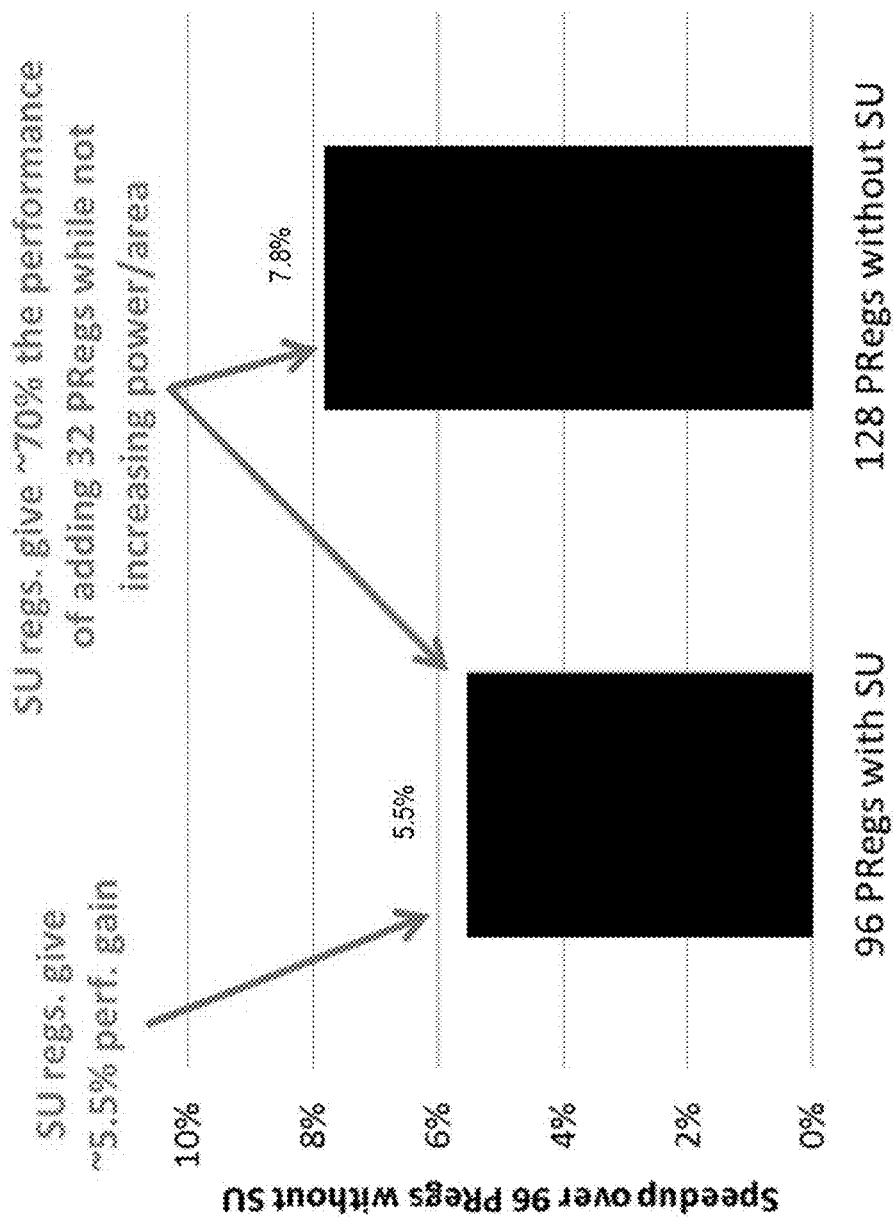
FIG. 14 illustrates performance benefits realized by embodiments of the invention.

FIG. 14 shows that a 5.5% IPC increase can be obtained on an 8-thread processor when Single Usage techniques are used to detect, mark and early-reclaim the physical registers (see, e.g., the column labeled "96 PRegs"). In addition, FIG. 14 shows that almost 70% of the IPC gain that can be obtained from a 33% larger register file can be obtained without any increase in the area occupancy of the register file simply by using the SU techniques disclosed herein (see, e.g., column labeled "128 Pregs").

Apparatus and Method for Efficient Register Allocation

One embodiment of the invention includes a Hardware-Software Co-designed Register Allocation (RA) scheme in the context of processors using a simplified epoch-based reclamation which results in higher utilization of the Physical Register File and higher performance. Specifically, one embodiment uses the Dynamic Binary Translation (DBT) module 903 or a compiler to detect Multi-Definition (MD) register cases. The DBT or compiler marks a logical register (LReg) as MD if it can guarantee that the LReg cannot be defined (i.e., written to) before all prior uses have executed (generally this order is guaranteed through the data dependencies). This allows the re-use of an LReg→PReg mapping without the need use another PReg and therefore reduces register pressure (otherwise an additional PReg would be held unnecessarily until the next writer's epoch retires).

In addition, when implemented in a micro-threaded processor with in-order execution of the instructions within a micro-thread, the embodiments described below classify some of the MD scenarios, where the producers and consumers of a Logical Register are all within the same micro-thread, as Thread Local (TL). TL registers have the benefit that dependence tracking in the RAT 814 and the reservation stations 830 can be avoided which results in additional power saving benefits.

In a conventional out-of-order (OOO) processor with in-order retirement, a PReg can be reclaimed once the next writer of the associated LReg has retired. For instance, in the following sequence of writers to logical destination register (LReg) L0, the PReg associated with the first instantiation of L0 (A) can be reclaimed after (C) retires:

A. Def L0
B. Use L0
C. Def L0

This condition is typically tracked in the ROB 840 at instruction granularity. However, a less precise scheme may be used to detect in-order retirement of definitions for register reclamation (e.g., in machines that do not use a ROB). The RAT 814 used by such a system may subdivide the in-order instruction stream into intervals called "epochs." New epochs are started at conditional branches or after a given number of instructions without such branch. Epochs retire in-order after all atoms belonging to this epoch and all older epochs have also retired. Epoch retirement occurs by tracking in-order advancement of the instruction stream in the retirement unit.

Figure 15:
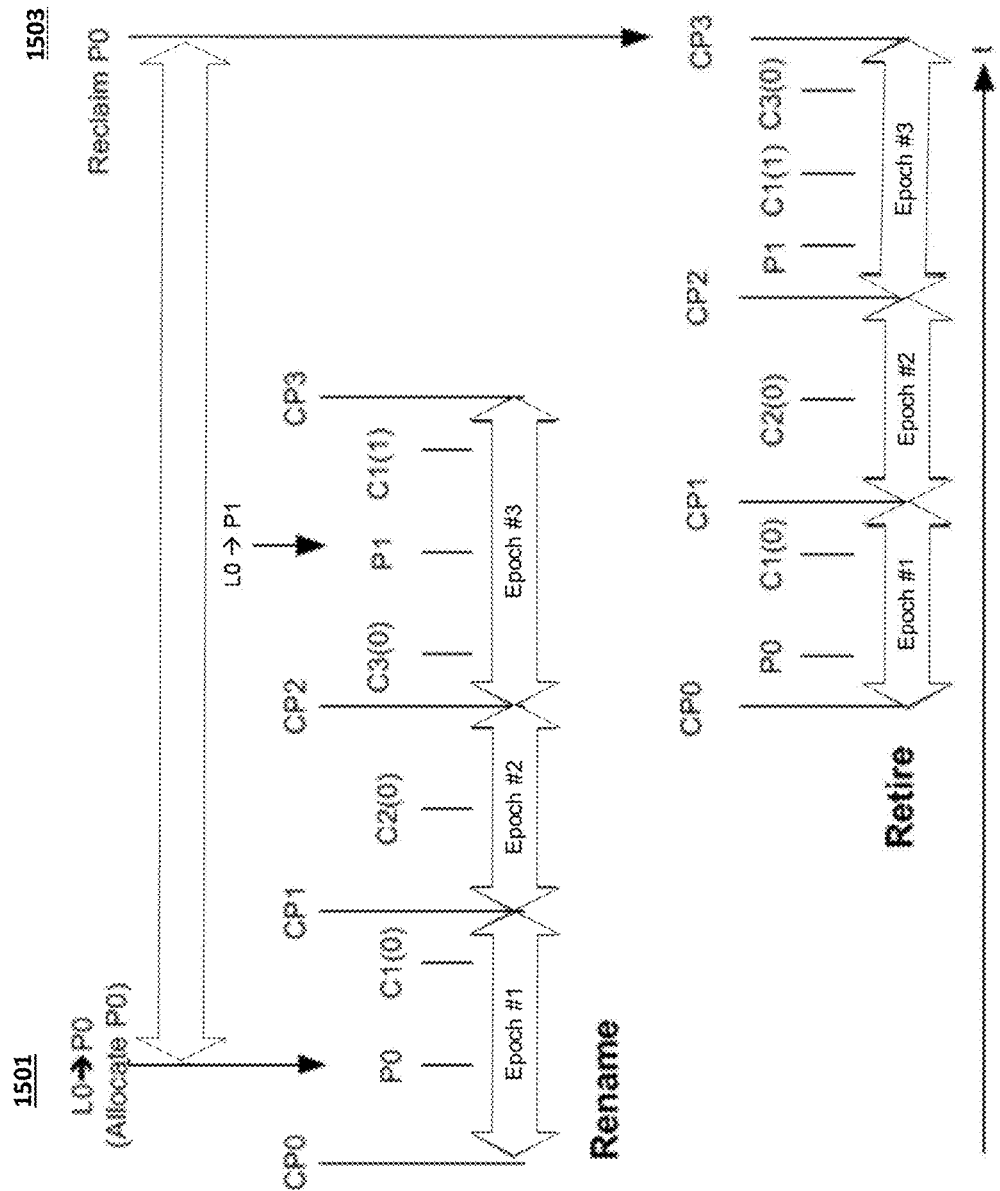
FIG. 15 illustrates an exemplary set of epochs employed in one embodiment of the invention.

FIG. 15 provides an example showing how epoch retirement triggers register reclamation using three epochs (#1, #2, and #3). In this example, the PReg P0, which is associated with the first definition of L0 at 1501 as illustrated, can be reclaimed when epoch #3 retires at 1503, in which the second writer of L0 is contained.

The default epoch-based register reclamation has the disadvantage that it may delay reuse of physical registers by a couple of instructions compared to the more precise ROB-based approach. Therefore one embodiment of the invention provides a more aggressive hardware/software co-designed approach that allows significantly earlier reclamation than the default.

Figure 16:
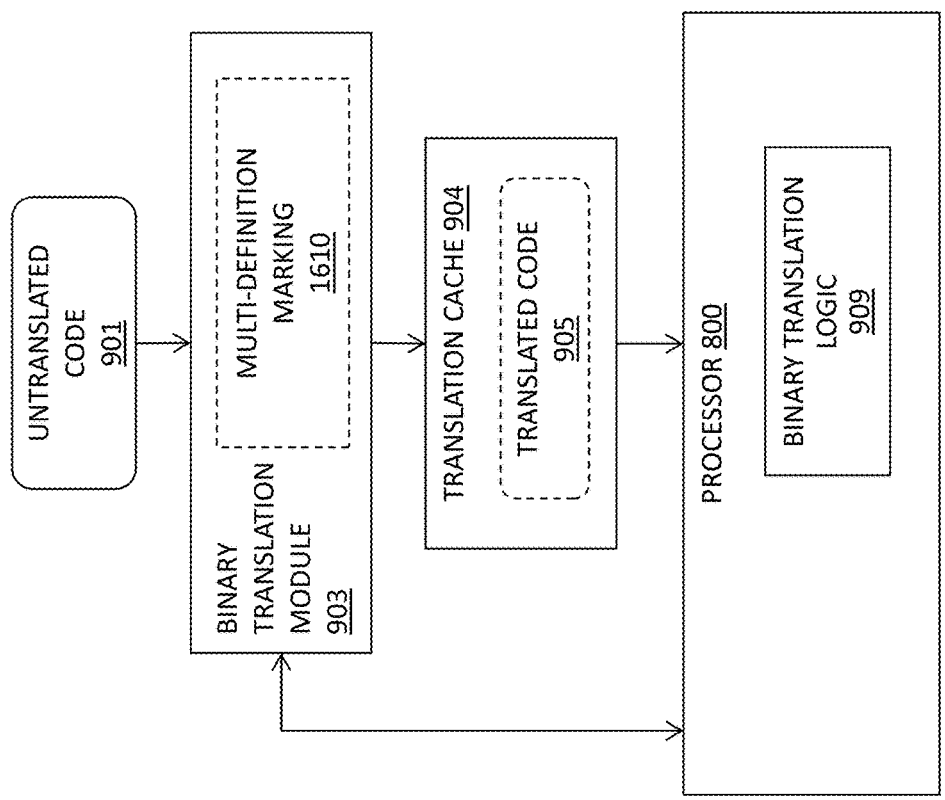
FIG. 16 illustrates multi-definition marking logic employed in one embodiment of the invention.

Specifically, one embodiment of the invention includes a hardware/software co-designed register allocation scheme that identifies scenarios where an existing LReg to PReg mapping may be reused, i.e., Multi-Definition (MD) registers. In one embodiment, the multi-definition (MD) logical registers are marked by the binary translator module 903 (or compiler) to indicate that the RAT 814 does not need to allocate a new PReg for this LReg—but can reuse the existing LReg→PReg mapping. FIG. 16 illustrates multi-definition marking logic 1610 within the binary translation module 903 which may perform the marking techniques described herein. In one embodiment, the LReg is marked as MD if it is guaranteed (due to dependences) that it cannot be written before the last earlier use of this register has executed. In one embodiment, this marking is performed as a "hint bit" on the instruction that writes the MD LReg.

Figure 17:
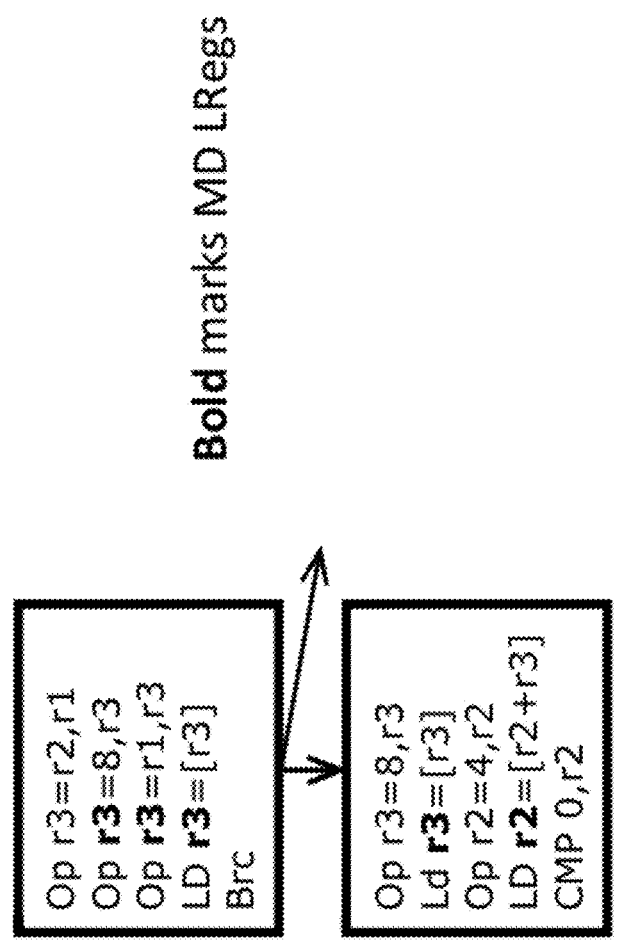
FIG. 17 illustrates an example MD marking for a simple sequence of two basic blocks.

The MD registers implemented in this manner reduce physical register pressure and reclamation logic activity since the existing LReg→PReg mapping is reused (i.e., there is a "partial renaming" benefit). FIG. 17 illustrates an example MD marking for a simple sequence of two basic blocks. In particular, the bold indicators for r3 and r2 indicate MD logical registers.

Figure 18:
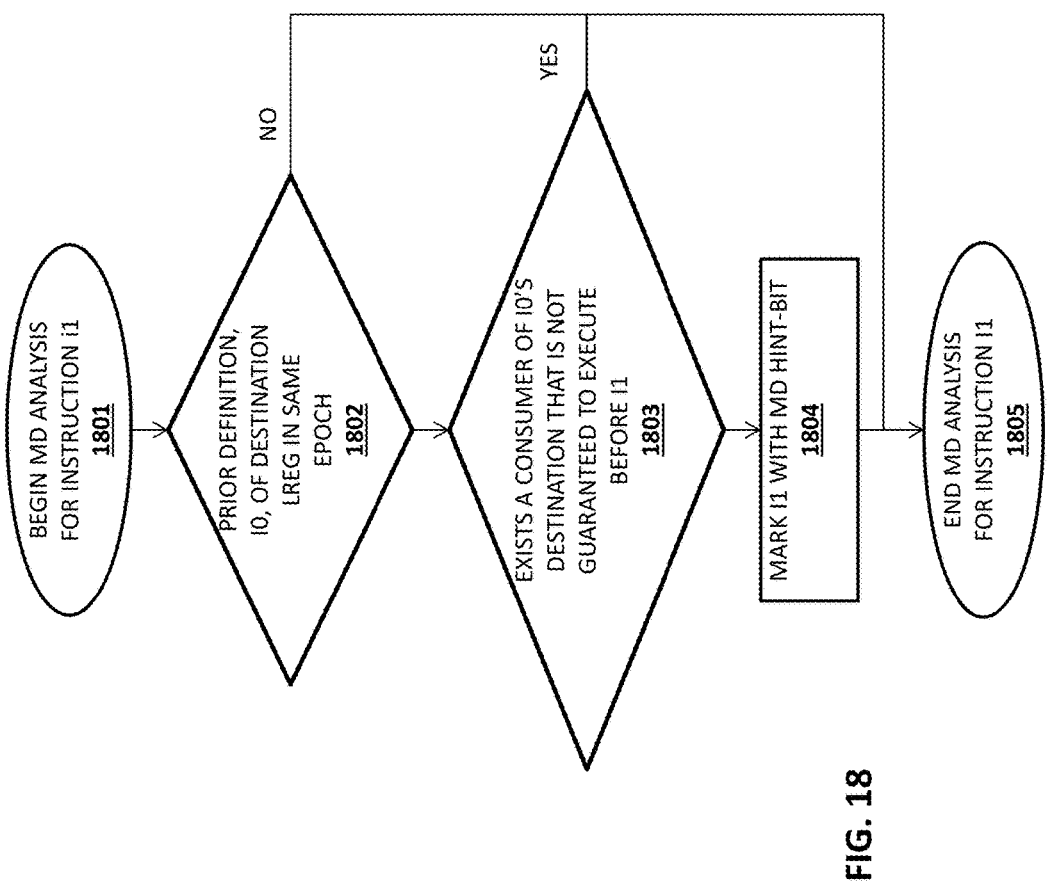
FIG. 18 illustrates one embodiment of a process for detecting and marking the multi-definition registers.

FIG. 18 illustrates one embodiment of a process employed by the multi-definition marking logic 1610 for detecting and marking the multi-definition registers. At 1801, the multi-definition analysis of a current instruction (I1) is performed and, at 1802, a determination is made as to whether the prior definition of the destination logical register (provided via instruction I0) is in the same epoch. If not, then the multi-definition analysis for the current instruction terminates at 1805. If so, then at 1803, a determination is made as to whether there exists a consumer of I0's destination that is not guaranteed to execute before the current instruction, I1. If so, then the multi-definition analysis for the current instruction terminates at 1805. If not, then at 1804, the current instruction, I1, is marked with a multi-definition hint bit, and the process terminates and 1805.

Some systems consist of multiple "threads" that each execute all instructions contained in a single thread in-order (but instructions from different threads may execute in parallel). In such a system, a subset of MD registers may be defined called thread-local (TL) registers. In one embodiment, these registers meet all the same requirements of MD registers described above, and also require that the definition and all consumers of the register be within the same thread (and that the writer of the register is a single-cycle operation). For TL registers, the same benefits of MD registers apply, but there is an added benefit that dependencies do not need to be tracked because the in-order execution of the producer and consumers of the value is guaranteed, which ensures that the proper value is in the register, thereby saving power RAT/RS activity is avoided.

One embodiment of the invention was simulated in the context of a VLIW full-system Dynamic Binary Translation based processor using a full-system functional and performance simulator. The DBT layer was augmented with the techniques described herein to detect and mark MD/TL registers using a hint bit. This bit was used by the modeled microarchitecture to avoid creating new RAT entries when allocating these instructions. The experimental setup was used to simulate Spec2000 and Spec2006 benchmarks.

Figure 19:
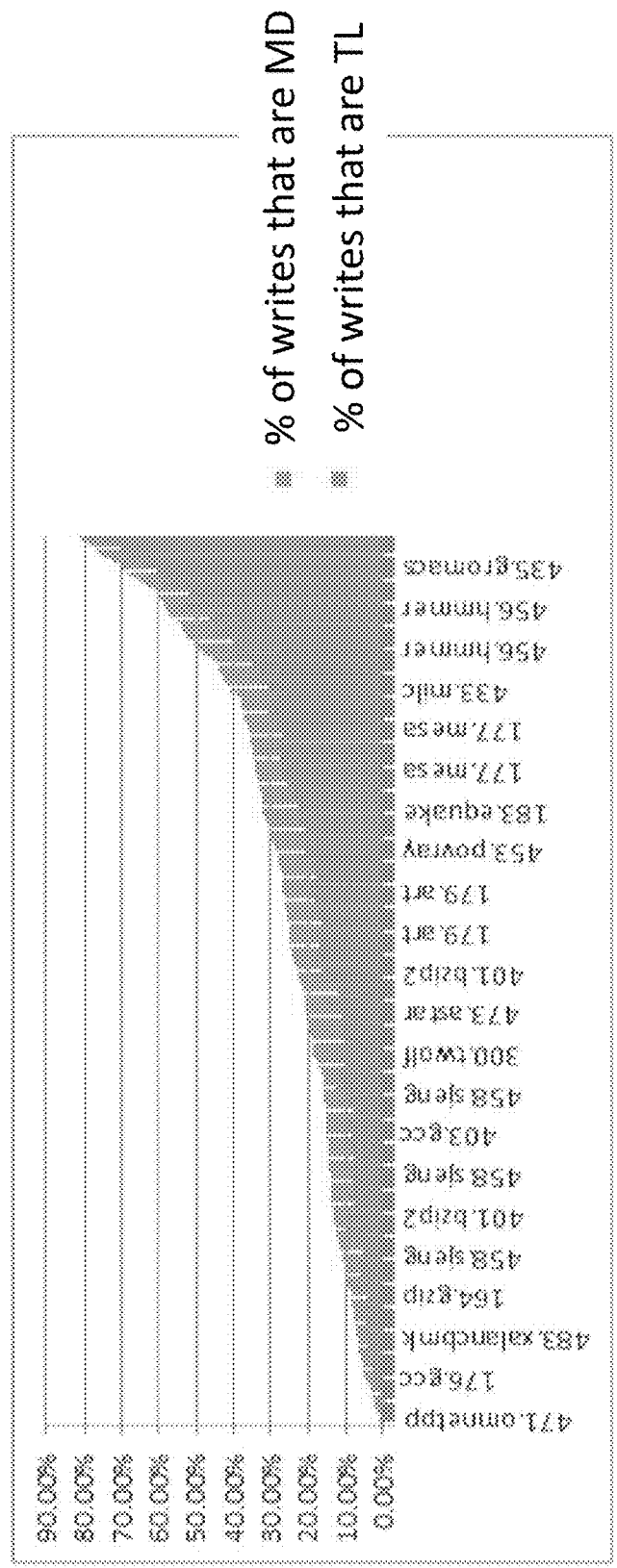
FIG. 19 illustrations the portion of dynamic register writes that are able to be marked as Multi-Definition (MD). and thread-local (TL) when implementing MD/TL detection in a DBT system.

FIG. 19 shows the portion of dynamic register writes that are able to be marked as MD and TL when implementing MD/TL detection in a DBT system. It can be seen that approximately 20% of all dynamic register values can be marked as MD/TL.

Figure 20:
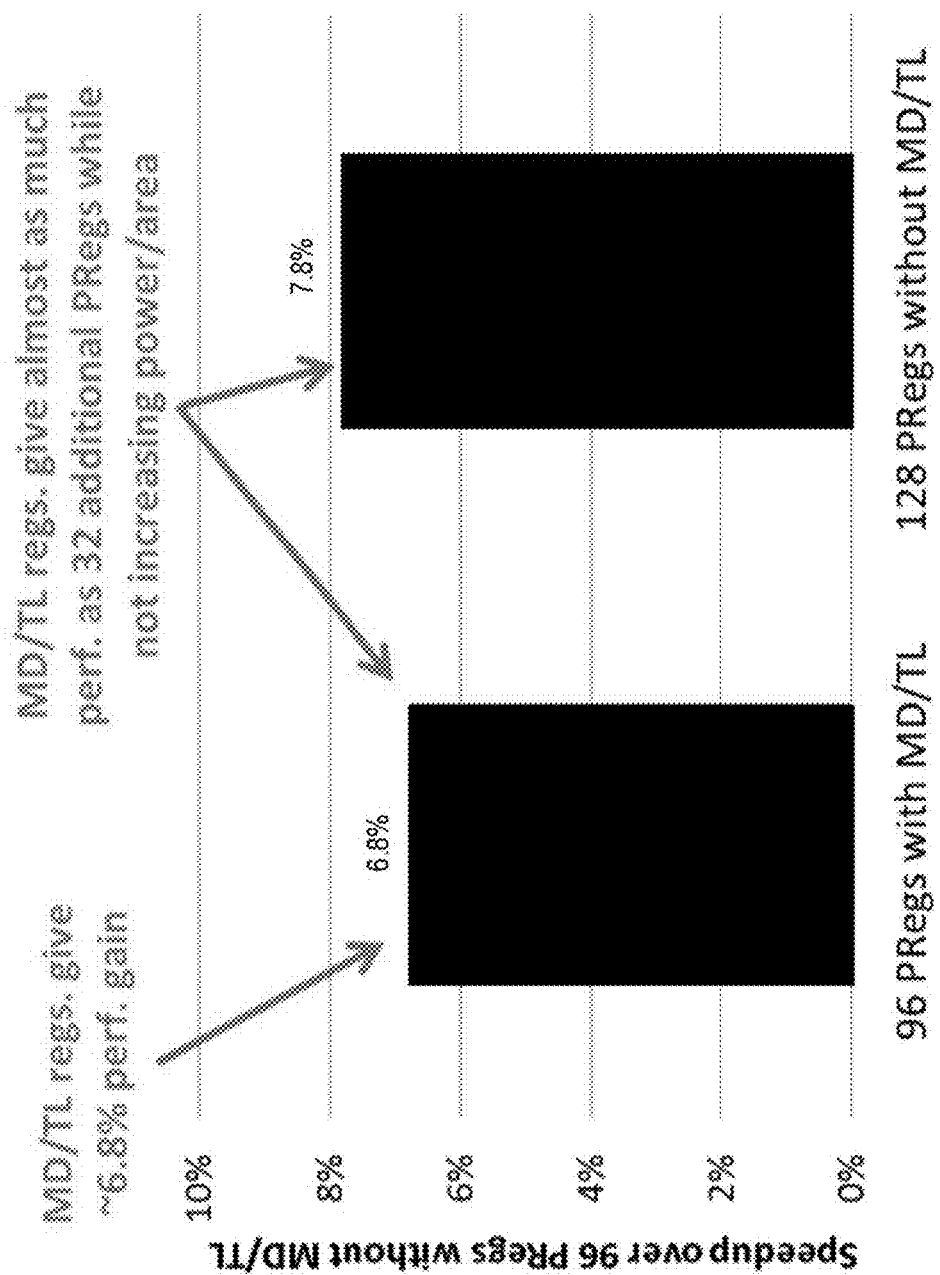
FIG. 20 illustrates performance gains realized by embodiments of the invention.

The benefits of MD/TL marking were also measured in a cycle accurate simulator. FIG. 20 shows a nearly 6.8% performance gain over the same system without MD/TL detection (i.e., MD/TL register marking increases IPC). It is also interesting to note that this results in nearly as much performance as would be gained by increasing the physical register file by ~33%, except MD/TLs as described do not require increasing the size of this hardware structure.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
single usage detection and tagging logic to examine a sequence of instructions to detect logical registers used by the sequence of instructions that have no more than a single use and to tag an instruction as a single usage instruction if the instruction is a consumer of a logical register that has no more than a single use, wherein the single usage detection and tagging logic is configured within a binary translation module to translate sequences of instructions for execution on a processor, the single usage detection and tagging logic further to:
identify a definition of the logical register by the instruction, and
check to determine if there is a path from the definition of the logical register to a translation exit without a re-definition of the logical register, wherein, if such a path is detected, then the logical register is determined to not be single usage;
an allocator to allocate processor resources to execute the sequence of instructions, the processor resources including physical registers mapped to logical registers to execute the sequence of instructions; and
register reclamation logic to free up a logical to physical mapping of a single use register in response to detecting the tag provided by the instruction tagging logic.

2. The apparatus as in claim 1 wherein detecting logical registers that have a single use comprises detecting that a logical register has no more than one consumer instruction in the sequence of instructions, the single usage detection and tagging logic to tag the consumer instruction to identify the consumer instruction as a single use instruction.

3. The apparatus as in claim 2 wherein detecting logical registers that have a single usage further comprises:
detecting that the logical register is defined as the destination of a first instruction;
detecting the logical register is used only once by the consumer instruction; and
detecting that a redefinition of the logical register by a second instruction occurs without any control flow dependence between the redefinition and the one use of the logical register by the consumer instruction.

4. The apparatus as in claim 3 wherein if the consumer instruction is not in a common basic block as the first instruction, the single usage detection and tagging logic is configured to ensure that there are no other paths leading from the first instruction which use the logical register.

5. The apparatus as in claim 4 wherein the consumer instruction is to be tagged as a single use instruction as long as no more than one usage of the logical register occurs on a path, and the redefinition of the logical register occurs unconditionally or on all conditional paths after the first usage without any intervening usages.

6. The apparatus as in claim 1 wherein the processor includes a commit/rollback-based atomic execution model for executing instructions and wherein any mis-speculation during speculative execution of instructions will result in the execution being rolled back to a most recent commit point and restarting execution from that point onwards, wherein the single usage detection and tagging logic is configured to ensure that a first instruction defining the single use logical register and the consumer instruction are in a common atomic region.

7. The apparatus as in claim 1 wherein if such a path is not detected then the single usage detection and tagging logic is configured to identify all paths from the definition to a re-definition of the logical register in a set P; and for all paths in the set P, check if there is a consumer of the logical register on this path, check if there are any possible paths from this consumer to the re-definition of the logical register where there is another consumer of this logical register; and if both these conditions are met, then mark the consumer instruction as a single usage instruction.

8. A method implemented within a binary translation system, comprising:
examining a sequence of instructions to detect logical registers used by the sequence of instructions that have no more than a single use, the examining comprising:
identifying a definition of a logical register by an instruction; and
checking to determine if there is a path from the definition of the logical register to a translation exit without a re-definition of the logical register, wherein, if such a path is detected, then the logical register is determined to not be single usage;
tagging the instruction as a single usage instruction if the instruction is a consumer of a logical register that has no more than a single use;
allocating processor resources to execute the sequence of instructions, the processor resources including physical registers mapped to logical registers to execute the sequence of instructions; and freeing up a logical to physical mapping of a single use register in response to detecting the tag provided by the instruction tagging logic.

9. The method as in claim 8 wherein detecting logical registers that have a single use comprises detecting that a logical register has no more than one consumer instruction in the sequence of instructions, the instruction tagging logic to tag the consumer instruction to identify the consumer instruction as a single use instruction.

10. The method as in claim 9 wherein detecting logical registers that have a single usage further comprises:
   detecting that the logical register is defined as the destination of a first instruction;
   detecting the logical register is used only once by the consumer instruction; and
   detecting that a redefinition of the logical register by a second instruction occurs without any control flow dependence between the redefinition and the one use of the logical register by the consumer instruction.

11. The method as in claim 10 wherein if the consumer instruction is not in a common basic block as the first instruction, ensuring that there are no other paths leading from the first instruction which use the logical register.

12. The method as in claim 11 wherein the consumer instruction is to be tagged as a single use instruction as long as only one usage of the logical register occurs on a path, and the redefinition of the logical register occurs unconditionally or on all conditional paths after the first usage without any intervening usages.

13. The method as in claim 8 wherein in a processor which uses a commit/rollback-based atomic execution model for executing instructions and wherein any mis-speculation during speculative execution of instructions will result in the execution being rolled back to a most recent commit point and restarting execution from that point onwards, ensuring that a first instruction defining the single use logical register and the consumer instruction are in a common atomic region.

14. The method as in claim 8 wherein if such a path is not detected then identifying all paths from the definition to a re-definition of the logical register in a set P; and for all paths in the set P, checking if there is a consumer of the logical register on this path, checking if there are any possible paths from this consumer to the re-definition of the logical register where there is another consumer of this logical register; and if both these conditions are met, then marking the consumer instruction as a single usage instruction.

15. A system comprising:
   a memory to store instructions and data;
   a plurality of cores to execute the instructions and process the data;
   a graphics processor to perform graphics operations in response to certain instructions;
   a network interface to receive and transmit the data over a network;
   an interface for receiving user input from a mouse or cursor control device, the plurality of cores executing the instructions and processing the data responsive to the user input;
   a binary translation module to translate sequences of instructions for execution, the binary translation module comprises single usage detection and tagging logic, the single usage detection and tagging logic to examine a sequence of instructions to detect logical registers used by the sequence of instructions that have no more than a single use and to tag an instruction as a single usage instruction if the instruction is a consumer of a logical register that has no more than a single use, the single usage detection and tagging logic to:
      identify a definition of the logical register by the instruction, and
      check to determine if there is a path from the definition of the logical register to a translation exit without a re-definition of the logical register, wherein, if such a path is detected, then the logical register is determined to not be single usage;
   an allocator to allocate processor resources to execute the sequence of instructions, the processor resources including physical registers mapped to logical registers to execute the sequence of instructions; and
   register reclamation logic to free up a logical to physical mapping of a single use register in response to detecting the tag provided by the instruction tagging logic.

16. The system as in claim 15 wherein detecting logical registers that have a single use comprises detecting that a logical register has no more than one consumer instruction in the sequence of instructions, the single usage detection and tagging logic to tag the consumer instruction to identify the consumer instruction as a single use instruction.

17. The system as in claim 16 wherein detecting logical registers that have a single usage further comprises:
   detecting that the logical register is defined as the destination of a first instruction;
   detecting the logical register is used only once by the consumer instruction; and
   detecting that a redefinition of the logical register by a second instruction occurs without any control flow dependence between the redefinition and the one use of the logical register by the consumer instruction.

18. The system as in claim 17 wherein if the consumer instruction is not in a common basic block as the first instruction, the single usage detection and tagging logic is configured to ensure that there are no other paths leading from the first instruction which use the logical register.

19. The system as in claim 18 wherein the consumer instruction is to be tagged as a single use instruction as long as only one usage of the logical register occurs on a path, and the redefinition of the logical register occurs unconditionally or on all conditional paths after the first usage without any intervening usages.

20. The system as in claim 15 wherein the processor includes a commit/rollback-based atomic execution model for executing instructions and wherein any mis-speculation during speculative execution of instructions will result in the execution being rolled back to a most recent commit point and restarting execution from that point onwards, wherein the single usage detection and tagging logic is configured to ensure that a first instruction defining the single use logical register and the consumer instruction are in a common atomic region.

21. The system as in claim 15 wherein if such a path is not detected then the single usage detection and tagging logic is configured to identify all paths from the definition to a re-definition of the logical register in a set P; and for all paths in the set P, check if there is a consumer of the logical register on this path, check if there are any possible paths from this consumer to the re-definition of the logical register where there is another consumer of this logical register; and if both these conditions are met, then mark the consumer instruction as a single usage instruction.

* * * * *